United States Patent

[11] 3,614,112

[72] Inventors Josef Herzog
Scotia;
Francis D. Ryan, Schenectady, both of N.Y.
[21] Appl. No. 799,185
[22] Filed Feb. 14, 1969
[45] Patented Oct. 19, 1971
[73] Assignee General Electric Company

[54] FLUID DEFLECTOR APPARATUS
7 Claims, 2 Drawing Figs.

[52] U.S. Cl. ............................................. 277/19, 277/67
[51] Int. Cl. ..................................................... F16j 15/54
[50] Field of Search .......................................... 277/18, 19, 67, 24, 53, 13.3

[56] References Cited
UNITED STATES PATENTS
| 1,749,586 | 3/1930 | Johnson | 277/53 |
| 2,891,808 | 6/1959 | Richardson | 277/67 X |
| 3,292,847 | 12/1966 | Herrick | 277/67 X |

Primary Examiner—Samuel C. Rothberg
Attorneys—William C. Crutcher, Frank L. Neuhauser and Oscar B. Waddell ABSTRACT: Fluid deflector apparatus of the annular type used on rotating shafts which has a perforated circumferential barrier to separate the annulus into two concentric annuli in order to slow the circumferential velocity of the deflected fluid and facilitate drainage.

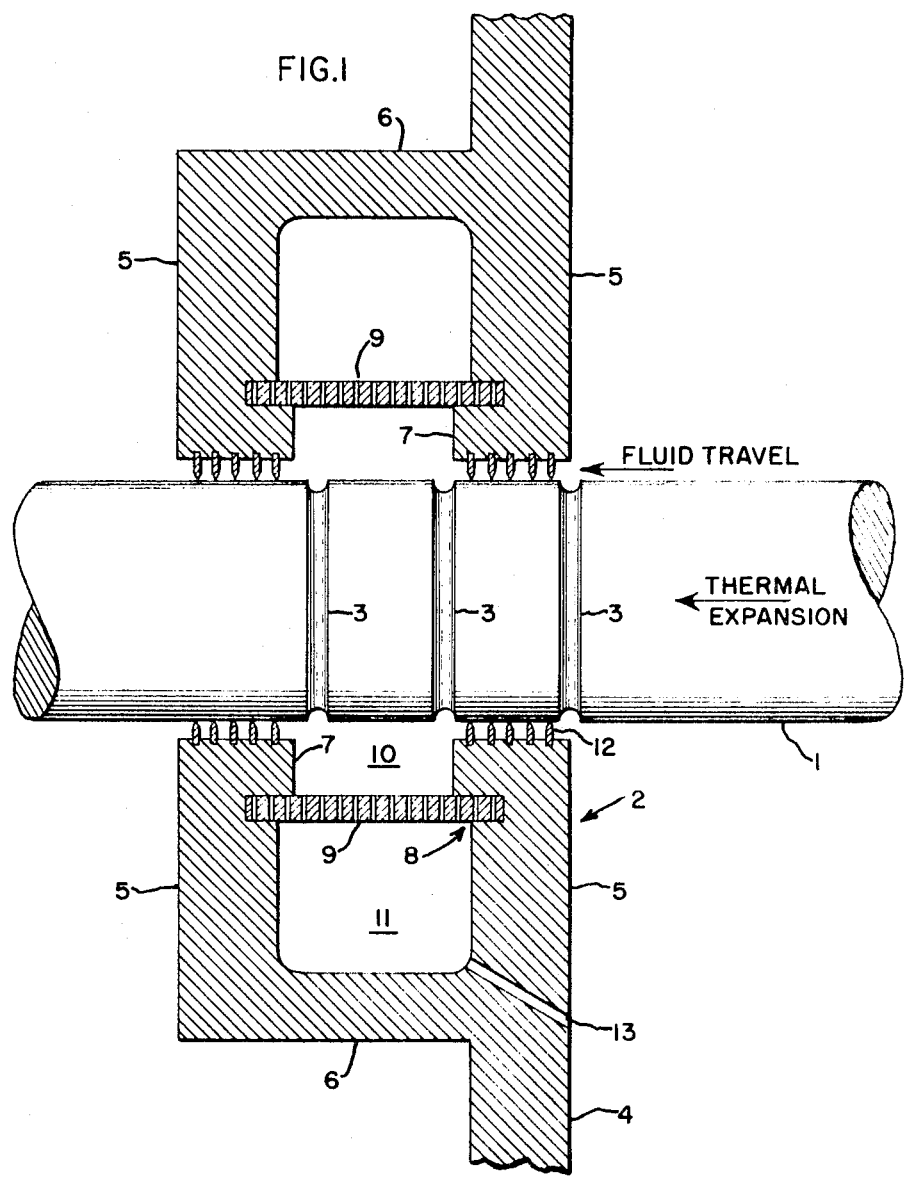
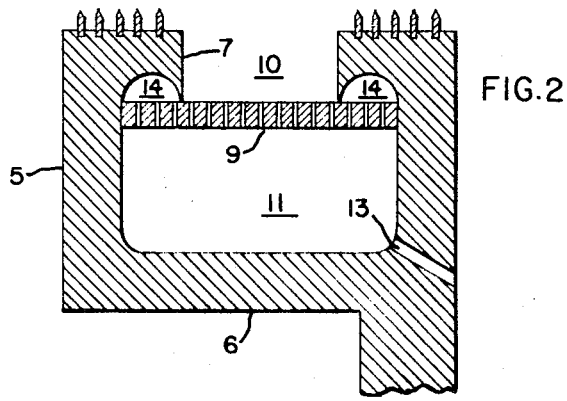

FLUID DEFLECTOR APPARATUS

BACKGROUND OF THE INVENTION

The present invention relates to fluid deflector apparatus used in rotating machinery In machines with rotating shafts, it is common practice to provide at points along the shaft lubricated bearings in order to have the least amount of friction for efficient and smooth running machinery. As the lubricating fluid escapes from the ends of the bearing, it tends to creep along the shaft in an axial direction as well as splash back onto the shaft from the walls of the bearing housing. The fluid deflector apparatus is employed to pick up this fluid, preventing leakage, and return it to the bearing fluid supply. It is understood that any fluid may be deflected and not just lubricating fluid. For example, it might be employed for moisture extraction on nuclear machines.

The fluid deflector apparatus of the prior art consists of an annular chamber mounted coaxially about the fluid slinger grooves on the rotating shaft. As the fluid creeps axially along the shaft, it reaches the fluid slinger grooves in the shaft where the fluid is then thrown radially outward by the rotating shaft and into the annular chamber where it drains back into the bearing housing, bearing fluid supply, or out of the machine, depending on the type of fluid being deflected. Fluid deflector teeth are usually provided on both sides of the annular chamber to minimize the amount of fluid passing along the shaft and to isolate this chamber from adjacent areas.

The prior art fluid deflector apparatus had a large axial dimension since a wide chamber was required in order to have efficient fluid deflection and subsequent drainage. A way was sought to reduce the axial width of the chamber since an overall reduction in the length of the machine shaft could then be realized. Accordingly, it is an object of the present invention to reduce the width of the annular fluid deflector apparatus.

Another object is to provide a fluid deflector apparatus with better draining characteristics.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing in which:

FIG. 1 is a view partly in section, of the shaft and annular fluid deflector apparatus of the present invention.

FIG. 2 is a view partly in section, showing an alternate embodiment of the invention.

SUMMARY OF THE INVENTION

Briefly stated, the invention is practiced in one form by providing an annular-type type fluid deflector apparatus with a circumferential perforated barrier so as to divide the annular chamber into two concentric annuli for better deflection and draining characteristics.

DESCRIPTION

Referring to FIG. 1 of the drawing, the preferred embodiment of the present invention is shown including a cylindrical shaft portion 1 and the fluid deflector apparatus generally indicated as 2.

Shaft portion 1 is shown with fluid slinger grooves 3 generally an equal distance from one another. The grooves extend around the circumference of the shaft a full 360°. A plurality of fluid slinger grooves is provided due to the thermal expansion and axial movement of shaft portion 1 as indicated in FIG. 1. Since one advantage of the present invention is that the fluid deflector axial width can be decreased, there must be a plurality of fluid slinger grooves having an axial spacing slightly less than the axial width of the annulus to compensate for any axial movement that may cause one of grooves 3 to become axially misaligned from its proper position. In practical application, there will usually be a bearing located on one side of the fluid deflector to support the rotatable shaft. For clarity, it is not shown in the drawing and does not form a part of this invention.

The annular deflector apparatus 2 is supported in a stationary position relative to shaft portion 1 by support means 4, which are only partially shown. Annular deflector apparatus 2 consists in part of two circumferential and axially extending web portion 6, which joins leg portions 5 together at their radially extended ends. At the shaft end of each leg portion 5 is a circumferential axial extension or base 7 which has the effect of reducing the axial width over a part of the annular chamber, i.e., the opening in the annular chamber toward shaft portion 1 is reduced. Axial extension 7 extends in a radial direction a short distance on the insides of legs 5 so as to form step 8 at the junction of leg 5 and base 7 on each inner side of leg 5. The annulus, generally defined by legs 5, web 6, base 7, and shaft portion 1 is divided into two annuli by a screened or perforated circumferential barrier 9, resulting in the formation of an inner annulus 10 and an outer annulus 11. Perforated barrier 9 is locked in place at the junction of inner annulus 10 and outer annulus 11 by suitable means including but not limited to the use of step 8 barrier 9 may be composed of either screen mesh or perforated metal. It is to be appreciated that an alternate embodiment of the present invention could exclude base 7 and still result in an improved oil deflector.

Positioned along the shaft side of base 7 are radially extending fluid deflector teeth 12. The radial clearance between teeth 12 and shaft portion 1 is generally as close as operating conditions will allow i.e., allowing for thermal expansion and the like. The number of fluid deflector teeth is optional.

In the lower part of outer annulus 11 (lower with respect to ground level) is a suitable draining means 13 arranged so that gravity flow will result when fluid deflector 2 is in operation, i.e., when shaft portion 1 is rotating and fluid is being deflected into the annuli, it will drain downward and out of the outer annulus through draining means 13.

Referring not to FIG. 2, wherein an alternate embodiment of out invention is shown, step 8 no longer is shown as having square corners. Circumferential cup-shaped grooves 14 are provided in step 8 so that when perforated barrier 9 is in place, a third and fourth annulus 14 is formed. Grooves 14 provide an improved draining path as the fluid drains from 102 of fluid deflector 2 to draining means 13. It will be appreciated that a portion of the deflected fluid will gravitate into the grooves 14 which then provide an improved path toward the bottom of fluid deflector deflector 2.

The operation of the present invention will now be described. As fluid from one or both sides of fluid deflector 2 creeps axially along rotating shaft portion 1, it enters the plurality of deflector teeth 12 where it meets a certain amount of resistance. Some of the fluid is able to continue its axial movement until it reaches the area of inner annulus 10 and the adjacent fluid slinger groove on shaft portion 1. Here the shaft surface discontinuity forces a thickening of the fluid film and a consequent breakup of this film due to centrifugal force exceeding surface tension. Fluid spins off the shaft tangentially at high circumferential fluid velocity. As the fluid is forced through a perforated barrier 9, it loses its tangential velocity. Once in the low velocity outer annulus, the fluid drains slowly to the bottom of fluid deflector 2 and out through drain means 13.

It will be appreciated that an improved annular-type fluid deflector apparatus has herein been described which allows the axial dimension of prior-art fluid deflectors to be decreased and one which provides improved draining characteristics due to the decreased fluid velocity in outer annulus. As a consequence of the decreased axial dimension, the overall length of the shaft can be decreased.

While there is shown what is considered at present to be the preferred embodiment of the invention, it is of course un-

What is claimed is:

1. a fluid deflector apparatus in a machine having a rotatable shaft, said apparatus comprising:
   an annular chamber surrounding a portion of said shaft and open toward the shaft side,
   a perforated circumferential barrier dividing said chamber into an inner and outer annulus,
   fluid-slinging means located along said shaft portion, means to support and deflector apparatus relative to said shaft portion, and
   drain means connected to relieve the outer annulus of excess fluid.

2. A fluid deflector apparatus according to claim 1 in which radially extending teeth are disposed between the shaft side of said axial extension and said shaft portion.

3. A fluid deflector apparatus according to claim 2 in which said axial extensions have an axial width therebetween less than the axial width of said outer annulus. facing 4. A fluid deflector apparatus according to claim 7 in which said outer annulus has a reactor axial dimension than said inner annulus, there being additional outwardly facing circumferential grooves defined in the axial extension inward of said barrier at the junction between inner and outer annuli to receive excess fluid from said outer annulus.

5. An annular fluid deflector apparatus having a rotatable shaft disposed therethrough, said apparatus comprising:
   an annular chamber surrounding a portion of said shaft and open toward the shaft side,
   a perforated circumferential barrier dividing said chamber into an inner and outer annulus,
   a radial dimension of said outer annulus being equal to or greater than the radial dimension of said inner annulus,
   an axial dimension of said outer annulus being equal to or greater than the axial dimension of said inner annulus,
   means to support said apparatus relative to said shaft portion, and
   drain means connected to relieve said outer annulus of excess fluid.

6. An oil deflector for a rotating shaft subject to drainage of oil axially along the shaft, comprising:
   a shaft portion defining a plurality of axially spaced circumferential grooves arranged to sling oil radially therefrom,
   an annular channel-shaped member surrounding said shaft portion and open toward the shaft sling also having axially spaced radial leg portions terminating in bases at their inner ends,
   a plurality of teeth attached to the bases and forming close clearances with the shaft portion to define a substantially closed chamber surrounding at least one of said grooves,
   a perforated circumferential barrier extending between said radial legs and dividing the chamber into an inner and outer annulus, whereby the inner-annulus receives high-velocity oil slung from said groove and said outer annulus receives lower velocity oil through said perforated barrier, and drain passages for removing oil from the outer annulus.

7. A fluid deflector apparatus according to claim 1 further including a circumferential axial extension on each side of said inner annulus toward the shaft side.